US010075037B2

(12) United States Patent
Ichikawa et al.

(10) Patent No.: US 10,075,037 B2
(45) Date of Patent: Sep. 11, 2018

(54) ELECTRIC MOTOR AND ELECTRIC POWER STEERING DEVICE USING THE SAME

(71) Applicant: Mitsubishi Electric Corporation, Tokyo (JP)

(72) Inventors: Takanori Ichikawa, Tokyo (JP); Satoru Akutsu, Tokyo (JP); Yoshihiko Onishi, Tokyo (JP); Yuji Takizawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 180 days.

(21) Appl. No.: 15/033,681

(22) PCT Filed: Mar. 19, 2014

(86) PCT No.: PCT/JP2014/057547
§ 371 (c)(1),
(2) Date: May 2, 2016

(87) PCT Pub. No.: WO2015/140961
PCT Pub. Date: Sep. 24, 2015

(65) Prior Publication Data
US 2016/0285331 A1    Sep. 29, 2016

(51) Int. Cl.
*H02K 1/28*    (2006.01)
*G01B 7/30*    (2006.01)
(Continued)

(52) U.S. Cl.
CPC .................. *H02K 1/28* (2013.01); *B62D 5/04* (2013.01); *G01B 7/30* (2013.01); *G01D 5/145* (2013.01);
(Continued)

(58) Field of Classification Search
CPC .......... H02K 1/02; H02K 1/28; H02K 11/215; H02K 29/08
See application file for complete search history.

(56) References Cited

U.S. PATENT DOCUMENTS 5,783,880 A    7/1998  Teshima et al.
5,796,200 A *  8/1998  Sakashita ............. H02K 1/2786
                                                29/596
(Continued)

FOREIGN PATENT DOCUMENTS

CN   203313003 U    11/2013
JP   62-135564 U     8/1987
(Continued)

OTHER PUBLICATIONS

Communication dated Dec. 6, 2016, issued by the Japan Patent Office in corresponding Japanese Application No. 2016-508397.
(Continued)

*Primary Examiner* — Dang Le
(74) *Attorney, Agent, or Firm* — Sughrue Mion, PLLC; Richard C. Turner

(57) ABSTRACT

An electric motor includes a cylindrical holder mounted to an end of a rotation shaft, a sensor magnet mounted to the holder, and a rotation sensor mounted at a position at which the rotation sensor opposes the sensor magnet in a direction of an axis of rotation and detecting a rotating field of the sensor magnet. The end of the rotation shaft has a cylindrical shape with a non-circular cross section formed of at least one plane and a curved surface in an outer peripheral portion. At least one of an inner peripheral portion and an outer peripheral portion of the holder forms a non-circular cross section formed of a plane parallel to the axis of rotation and a curved surface connected to the plane. The plane of the rotation shaft and the plane of the holder are parallel to each other
(Continued)

and the curved surface of the rotation shaft and the curved surface of the holder are in contact with each other.

17 Claims, 12 Drawing Sheets

(51) Int. Cl.

| | | |
|---|---|---|
| G01D 5/14 | (2006.01) | |
| H02K 11/215 | (2016.01) | |
| B62D 5/04 | (2006.01) | |
| H02K 1/02 | (2006.01) | |
| G01D 5/244 | (2006.01) | |
| G01D 11/24 | (2006.01) | |
| H02K 7/00 | (2006.01) | |
| H02K 29/08 | (2006.01) | |

(52) U.S. Cl.
CPC ....... *G01D 5/24423* (2013.01); *G01D 11/245* (2013.01); *H02K 1/02* (2013.01); *H02K 11/215* (2016.01); *H02K 7/003* (2013.01); *H02K 29/08* (2013.01)

(56) References Cited

U.S. PATENT DOCUMENTS

| | | |
|---|---|---|
| 5,825,586 A | 10/1998 | Teshima |
| 6,160,334 A | 12/2000 | Teshima et al. |
| 6,198,185 B1 * | 3/2001 | Bruhn ................ F16B 21/20 310/216.121 |
| 2008/0272660 A1 | 11/2008 | Becker et al. |
| 2011/0181221 A1 * | 7/2011 | Asahi ................ G01D 5/145 318/400.39 |
| 2012/0104906 A1 * | 5/2012 | Tang ................ H02K 29/08 310/68 B |

FOREIGN PATENT DOCUMENTS

| | | |
|---|---|---|
| JP | 5-316705 A | 11/1993 |
| JP | 6-62784 U | 9/1994 |
| JP | 2005-318687 A | 11/2005 |
| JP | 4230958 B2 | 2/2009 |
| JP | 2010-93869 A | 4/2010 |
| JP | 2013-7731 A | 1/2013 |

OTHER PUBLICATIONS

Communication dated Oct. 25, 2017, from the European Patent Office in counterpart application No. 14885856.6.
International Search Report of PCT/JP2014/057547, dated May 27, 2014. [PCT/ISA/210].
Communication dated Jan. 29, 2018, from State Intellectual Property Office of the P.R.C. in counterpart application No. 201480077236.3.

* cited by examiner

200

200

ELECTRIC MOTOR AND ELECTRIC POWER STEERING DEVICE USING THE SAME

CROSS REFERENCE TO RELATED APPLICATIONS

This application is a National Stage of International Application No. PCT/JP2014/057547 filed Mar. 19, 2014, the contents of all of which are incorporated herein by reference in their entirety.

TECHNICAL FIELD

The present invention relates to an electric motor for vehicle and an electric power steering device using the same.

BACKGROUND ART

An electric motor in the related art includes a sensor magnet and a cover member fixed to an end of a rotation shaft and covering at least a part of the end. The cover member has a holder located outside of an end face at the end of the rotation shaft. The holder includes a space portion with a non-circular cross section that extends in a direction of an axis of rotation of the rotation shaft. An outer shape of the sensor magnet is of a non-circular shape formed so as to conform to the sectional shape of the space portion. Hence, rotations of the sensor magnet about the axis of rotation are regulated by inserting the sensor magnet into the space portion (as is described, for example, in PTL 1).

In another electric motor in the related art, an end of the rotation shaft is of a non-circular shape having at least one planar portion and the sensor magnet is provided with an attachment hole of a non-circular shape same as the non-circular shape of the end of the rotation shaft. The sensor magnet is mounted to the rotation shaft by loose-fitting. Herein, rattling in the mount portions is suppressed by inclining the sensor magnet with respect to the rotation shaft until a part of the sensor magnet makes contact with the rotation shaft (as is described, for example, in PTL 2).

CITATION LIST

Patent Literatures

PTL 1: JP-A-2010-93869
PTL 2: Japanese Patent No. 4230958

SUMMARY OF INVENTION

Technical Problem

When the mount portions of the cover member and the rotation shaft are of a circular shape as in PTL 1, there is no positioning portion in a rotation direction of the electric motor. Accordingly, an angular error between the sensor magnet and a rotor magnet deteriorates detection accuracy of a rotation angle of the motor. An electric power steering device equipped with such an electric motor therefore fails to generate an adequate assist torque and has a problem that steering feeling becomes poor. Herein, because the sensor magnet and a groove in the holder are of a non-circular shape, rotations of the sensor magnet about the axis of rotation can be regulated. However, because fit portions of the holder and the rotation shaft are of a circular shape, rotations of the holder about the axis of rotation cannot be regulated. Accordingly, angular displacement occurs between the sensor magnet and the rotor angle when the holder slides in the rotation direction. Hence, the same problem as described above also occurs. Further, because the holder is in contact with and fixed to the end face of the rotation shaft, a clearance between the sensor magnet and the rotation sensor disposed oppositely to the sensor magnet in close proximity varies considerably due to an integrated tolerance of motor parts, and detection accuracy becomes unstable. In order to reduce a variation, a tolerance between parts has to be reduced, which causes an increase of the manufacturing costs.

The electric motor in the electric power steering device for vehicle has to be lightweight in order to improve fuel efficiency of the vehicle and also has to assist the steering with an adequate steering torque by detecting a rotation angle of the electric motor correctly. That is to say, when the number of parts forming the electric motor is increased, there arises a problem that fuel efficiency of the vehicle becomes poor, and when a rotation angle of the electric motor cannot be detected correctly, there arises a problem that the steering becomes difficult. Further, because the electric power steering device is installed to hundreds of thousands to millions of vehicles, it goes without saying that the electric motor has to be made of simple materials, easy to process, easy to assemble, and inexpensive by reducing the material costs, the processing costs, and the assembly costs. The motor of PTL 1 is disadvantageous to reduce the weight and the costs for the following reasons: the holder used as a magnet cover is made of brass and formed in a complex shape provided with a polygonal hole and a circular hole; the sensor magnet is made of expensive rear-earth materials sintered at high density (that is, the sensor magnet is more expensive and heavier than a typical resin-molded magnet); and another member, such as an elastic member, is required when the holder and the sensor magnet are fixed without using an adhesive.

When the hole provided to the sensor magnet and the rotation shaft are directly mounted as in the motor of PTL 2, positional accuracy of the sensor magnet depends on molding accuracy of the magnet. However, molding accuracy is low in comparison with mechanical processing. Hence, positional accuracy of the sensor magnet and the rotor magnet is also deteriorated and so is detection accuracy of a rotation angle of the motor. The steering feeling therefore becomes poor. In addition, because the sensor magnet is mounted to the rotation shaft by inclining the sensor magnet, a clearance between the sensor magnet and a rotation angle detector differs from one rotation position to another and a magnetic flux becomes inhomogeneous. Because detection accuracy of a rotation angle differs from one rotation position to another, the steering feeling becomes poor. Further, rotations of the sensor magnet about the axis of rotation are regulated by fitting the non-circular portions of the sensor magnet and the rotation shaft. However, when an external force is applied to the magnet as a molded article, breaking or chipping may possibly occur. Hence, there arises a problem that the product quality is deteriorated considerably. Because the holder is in contact with and fixed to the end face of the rotation shaft, an integrated tolerance of the motor parts makes a clearance between the rotation sensor and the sensor magnet vary considerably. Detection accuracy thus becomes instable. In order to reduce such a variation, a tolerance between the parts has to be reduced, which causes an increase of the manufacturing costs. In addition, because the motor of PTL 2 requires a washer, which is a member different from the holder, this motor is disadvantageous to reduce the weight and the costs.

The invention was devised to solve the problems discussed above and has an object to obtain an electric motor and an electric power steering device with good steering performance and high reliability by enhancing detection accuracy of a rotation angle of the electric motor and by mounting a sensor magnet to a holder or a rotation shaft at high strength with a simple structure.

Solution to Problem

Each of an electric motor and an electric power steering device of the invention includes: a rotation shaft; a rotor mounted to the rotation shaft; a stator mounted so as to oppose an outer peripheral surface of the rotor; a cylindrical holder mounted to an end of the rotation shaft; a sensor magnet mounted to the holder; and a rotation sensor mounted at a position at which the rotation sensor opposes the sensor magnet in a direction of an axis of rotation and detecting a rotating field of the sensor magnet. The end of the rotation shaft where the holder is mounted has a cylindrical shape with a non-circular cross section formed of at least one plane and a curved surface in an outer peripheral portion. At least one of an inner peripheral portion and an outer peripheral portion. of the holder forms a non-circular cross section formed of a plane parallel to the axis of rotation and a curved surface connected to the plane. The plane of the rotation shaft and the plane of the holder are parallel to each other and the curved surface of the rotation shaft and the curved surface of the holder are in contact with each other.

Effects of Invention

According to the invention configured as above, positioning accuracy of the sensor magnet and the rotation shaft can be secured. Consequently, detection accuracy of a rotation angle of the electric motor can be enhanced. In addition, because the planar portions of the holder and the rotation shaft engage with each other, rotations of the sensor magnet about the axis of rotation can be suppressed.

DESCRIPTION OF EMBODIMENTS

Hereinafter, preferred embodiments of an electric motor and an electric power steering device of the invention will be described with reference to the accompanying drawings.
First Embodiment FIG. 1 is a block diagram of an electric power steering device 100 according to a first embodiment of the invention.

Figure 1:
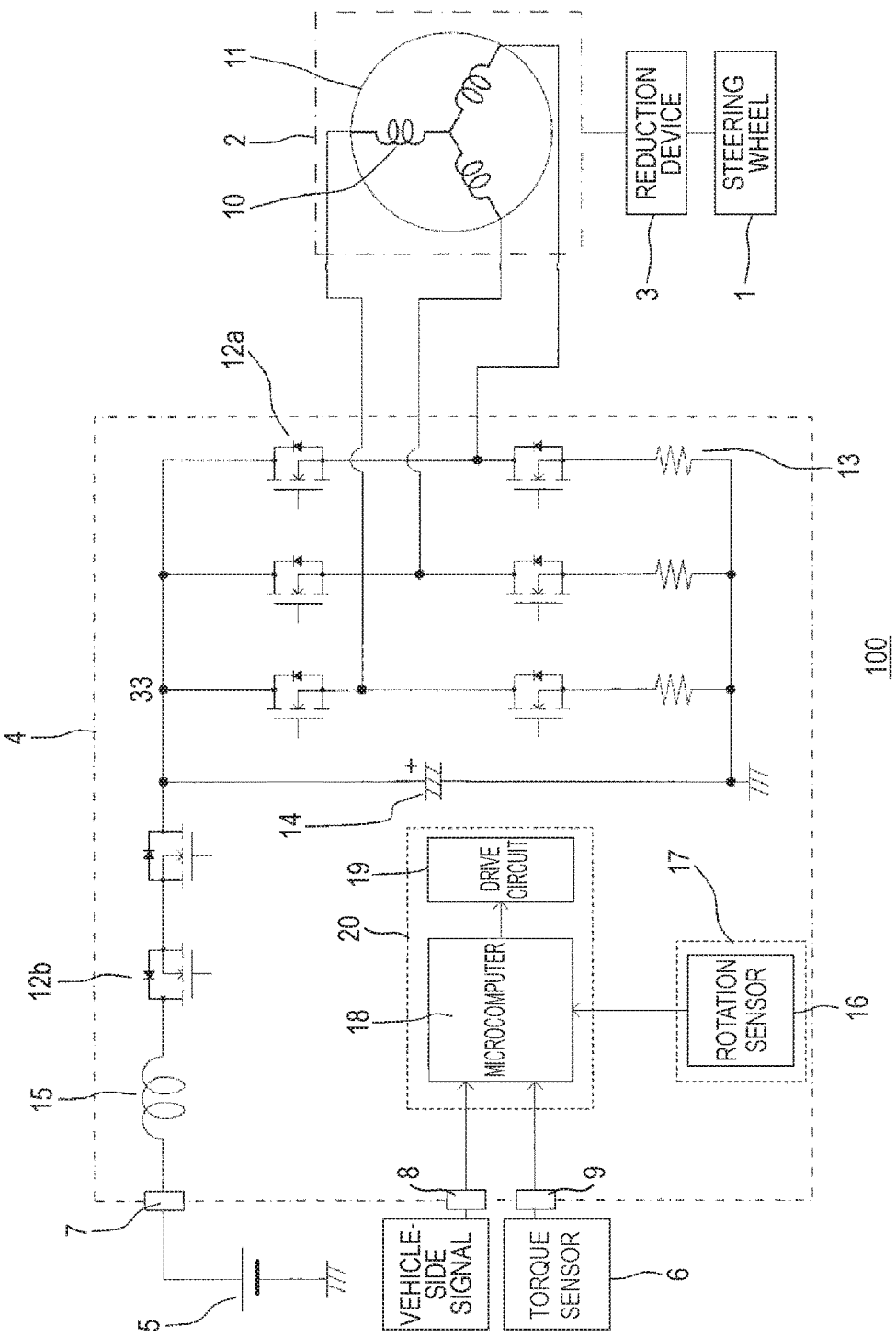
FIG. 1 is a block diagram of an electric power steering device according to a first embodiment of the invention.

Referring FIG. 1, the electric power steering device 100 includes a steering wheel 1 operated by a driver, an electric motor 2 assisting the steering by outputting a torque to the steering wheel 1, a reduction device 3 reducing a rotation speed of the electric motor 2, a control device 4 controlling the driving of the electric motor 2, a battery 5 supplying a current to drive the electric motor 2, a torque sensor 6 detecting a steering torque of the steering wheel 1, a power connector 7 electrically connecting the battery 5 and the control device 4, a vehicle-side signal connector 8 receiving an input of vehicle-side signals, such as a vehicle travel speed signal, from the vehicle, and a torque sensor connector 9 electrically connecting the torque sensor 6 and the control device 4.

A configuration of the electric motor 2 will be described first.

The electric motor 2 is a three-phase brushless motor and includes a stator 11 having an armature winding 10 made up of a phase U, a phase V, and a phase U, and a rotor 24 (see FIG. 2) positioned oppositely to the stator 11 in a radial direction and described below. The armature windings 10 of the stator 11 can adopt either a Y-connection configuration or a Δ-connection configuration. Herein, the Y-connection configuration is shown.

A configuration of the control device 4 will now be described.

The control device 4 includes semiconductor switching elements 12a, such as FETs, switching a motor current according to magnitude and a direction of an assist torque outputted to the steering wheel 1, semiconductor switching elements 12b, such as FETs, forming a power-supply relay as switching means for passing and interrupting a battery current supplied from the battery 5 to the semiconductor switching elements 12a, shunt resistors 13 to detect the motor current, a smoothing capacitor 14 to absorb a ripple component of the motor current flowing to the electric motor 2, a power circuit 33 described below on which the shunt resistors 13 and the semiconductor switching elements 12a and 12b are mounted, a coil 15 preventing electromagnetic noises generated at switching actions of the semiconductor switching elements 12a from flowing to an outside, a rotation sensor 16 detecting a rotation angle of the rotor 24 described below, a sensor board 17 on which the rotation sensor 16 is mounted, a microcomputer 18 computing an assist torque on the basis of a steering torque signal from the torque sensor 6 and computing a current comparable to the assist torque on the basis of the feedback of the the motor current and the rotation angle of the rotor 24 detected in the rotation sensor 16, a drive circuit 19 outputting drive signals to control operations of the semiconductor switching elements 12a according to a command from the microcomputer 18, and a control board 20 on which the microcomputer 18 and the drive circuit. 19 are mounted.

The microcomputer 18 receives inputs of a steering torque from the torque sensor 6, rotation angle information of the rotor 24 from the rotation sensor 16, and a travel speed signal from the vehicle-side communication connector 8. The microcomputer 18 also receives an input of the motor current fed back from the shunt resistors 13. On the basis of these information and signals, the microcomputer 18 generates a command of rotation direction for power steering and a current control amount comparable to the assist torque, and inputs respective drive signals into the drive circuit 19.

Upon input of the command of rotation direction and a current control amount, the drive circuit 19 generates drive signals which are applied to the semiconductor switching elements 12a. Consequently, a current flows from the battery 5 to the electric motor 2 via the power connector 7, the coil 15, and the semiconductor switching elements 12b and 12a. Hence, a desired amount of assist torque flows in a desired direction. A motor current detected through the shunt resistors 13 in this instance is fed back to the microcomputer 18. The motor current is thus controlled to agree with the motor current command sent from the microcomputer 18 to the drive circuit 19. Also, the motor current is controlled after a ripple component generated when the semiconductor switching elements 12 are driven to switch is smoothed in the smoothing capacitor 14.

Figure 2:
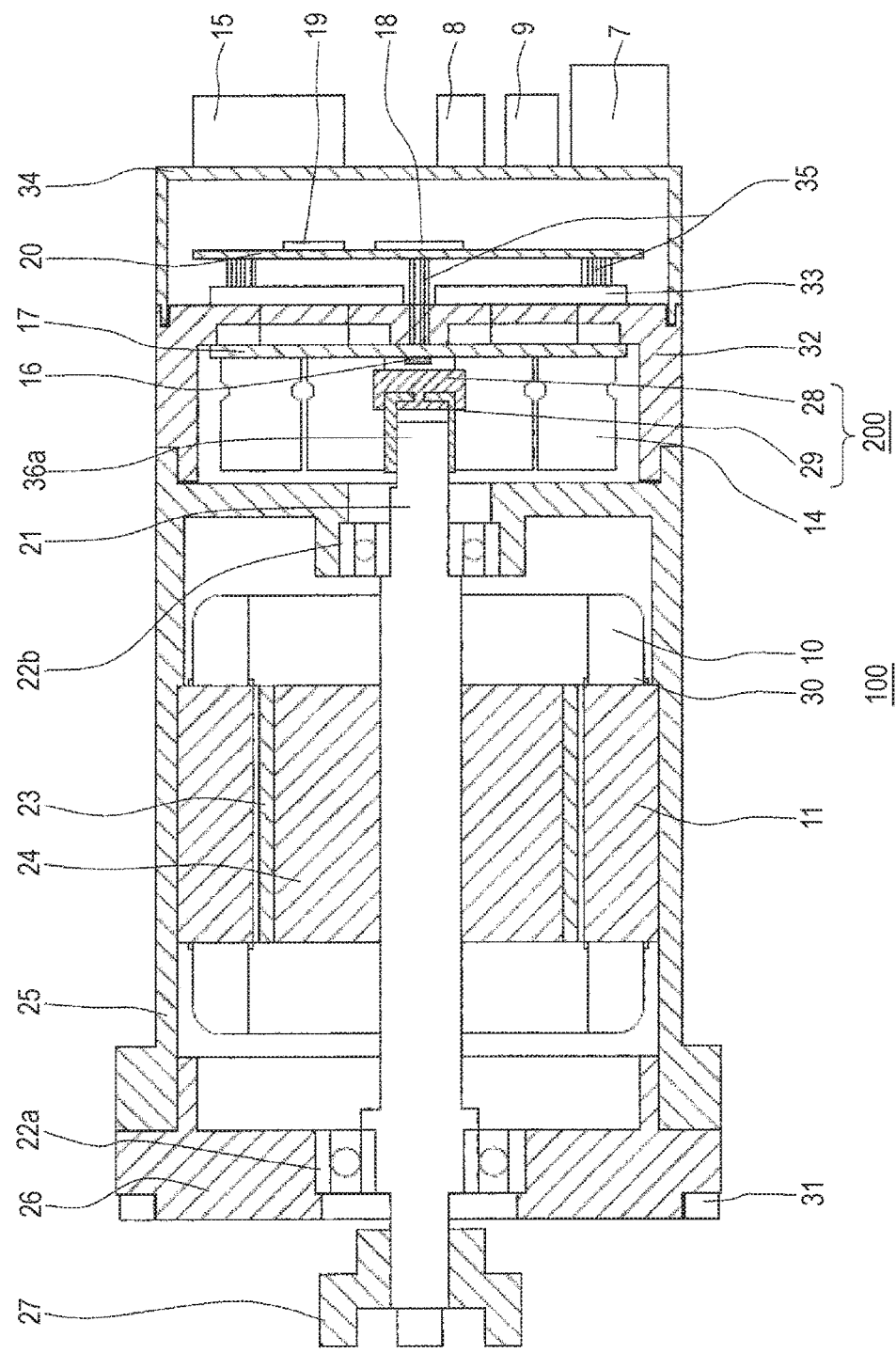
FIG. 2 is a sectional view of the electric power steering device according to the first embodiment of the invention.

A structure of the electric power steering device 100 will now be described with reference to FIG. 2. FIG. 2 is a sectional view of the electric power steering device 100 of the first embodiment.

A structure of the electric motor 2 will be described first.

The electric motor 2 includes a rotation shaft 21, bearings 22a and 22b on which the rotating shaft 21 is supported in a rotatable manner, the rotor 24 to which multiple magnetized rotor magnets 23 are fixed in a circumferential direction, the stator 11 provided so as to oppose an outer peripheral surface of the rotor 24, a frame 25 to which the stator 11 is fixed, a housing 26 connected to one end of the frame 25 and to which the bearing 22a is mounted, a coupling 27 fixed to an end of the rotation shaft 21 and transmitting a torque of the electric motor 2, and a sensor magnet assembly 200 formed of a magnetized sensor magnet 28 and a holder 29 integrated into one unit and attached to an end of the rotation shaft 21 on an opposite side to the end where the coupling 27 is fixed.

The stator 11 is formed, for example, by fixing 0.3 to 0.5-mm-thick magnetic steel sheets (not shown) laminated in a direction of an axis of rotation of the electric motor 2 by die-cutting caulking or welding. The stator 11 also includes an insulator 30 inserted among magnetic-pole teeth not shown) facing an outer periphery of the rotor magnets 23 disposed along the outer periphery of the rotor 24, and the armature winding 10 wound around the insulator 30 and connected to the three phases U, V, and W. Winding terminals of the armature winding 10 extend parallel to the direction of the axis of rotation of the electric motor 2 toward the control device 4 (rightward in the drawing) and connect to output terminals of the phases U, V, and W. The frame 25 having a mount portion for the stator 11 is disposed in an outer peripheral portion of the stator 11. The stator 11 is mounted to the frame 25, for example, by thermal insert or press-fitting. The stator 11 is thus fixed.

As with the stator 11, the rotor 24 is formed, for example, by fixing 0.3 to 0.5-mm-thick magnetic steel sheets (not shown) laminated in the direction of the axis of rotation of the electric motor 2 by die-cutting caulking or welding. For example, when the rotor 24 adopts an SPM (Surface Permanent Magnet) structure, the rotor magnets 23 formed of a permanent magnet are fixed along the outer periphery of the rotor 24 with an adhesive or the like. The rotor magnets 23 are magnetized before or after the rotor magnets 23 are fixed to the rotor 24.

The frame 25 is provided with mount portions for the stator 11 and the bearing 22b. The stator 11 is mounted to the frame 25, for example, by press-fitting or thermal insert, and the bearing 22b is mounted to the frame 25, for example, by press-fitting. Each of the stator 11 and the bearing 22b is thus fixed to the frame 25. An end face of the frame 25 is provided with fit portions for the housing 26 and a heat sink 32 described below. The end face is processed at a high degree of accuracy to secure positional accuracy of respective parts.

The housing 26 includes a mount portion for the bearing 22a. The bearing 22a is mounted to the housing 26, for example, by press-fitting or thermal insert, and is thus fixed. The housing 26 also includes a fit portion for the end face of the frame 25. The fit portion and one end of the frame 25 are fit together and fixed with screws 31. In order to secure air-tightness in the electric motor 2, a seal member, such as an O-ring (not shown) and an adhesive (not shown), is applied to the the fit portions of the housing 26 and the frame 25.

The coupling 27 is fixed at one end of the rotation shaft 21 by, for example, press-fitting and transmits a drive force to a transmission mechanism (riot shown) of the electric power steering device 100. The rotation shaft 21 is allowed to rotate when both ends are fit to the bearings 22a and 22b. At one end fit to the bearing 22b, the rotation shaft 21 has a fit portion 36a for the sensor magnet assembly 200 described below. As has been described, the sensor magnet assembly 200 is formed of the holder 29 and the sensor magnet 28. The sensor magnet 28 is mounted so as to oppose the rotation sensor 16 described below in the direction of the axis of rotation.

A structure of the control device 4 will now be described.

The control device 4 controlling the driving of the electric motor 2 is disposed on the axis of rotation of the electric motor 2. The control device 4 includes the heat sink 32 dissipating heat generated in the respective parts, the power circuit board 33 formed of semiconductor switching elements 12 and mounted to the heat sink 32, the control board. 20 on which the microcomputer 16 generating drives signals of the semiconductor switching elements 12 and the drive circuit 19 are mounted, the sensor board 17 on which the rotation sensor 16 detecting a rotation angle of the rotor 24 is mounted, the smoothing capacitor 14 to remove a ripple component from a motor current flowing to the electric motor 2, the coil 15 to remove electromagnetic noises, a circuit case 34, and a bus bar 35 electrically interconnecting the respective parts.

The rotation sensor 16 detects a rotation angle of the rotor 24 by detecting an orientation of a magnetic field generated by the sensor magnet 28. The rotation sensor 16 is disposed oppositely to the sensor magnet 28, which is mounted to one end of the rotation shaft 21, in the direction of the axis of rotation of the electric motor. The rotation sensor 16 is mounted on the sensor board 17. The sensor board 17 is fixed in a part of the heat sink 32 with screws (not shown) or the like. The sensor board 17 and the control board 20 are electrically connected via the bus bar 35. The rotation sensor 16 is formed of a magneto-resistance effect element (MR element), an anisotropic magneto-resistance layer element (AMR element), a giant magneto-resistance effect element (GMR element), or a tunneling magneto-resistance element (TMR element). The rotation sensor 16 can be a single die, a dual die, or the like.

Figure 3:
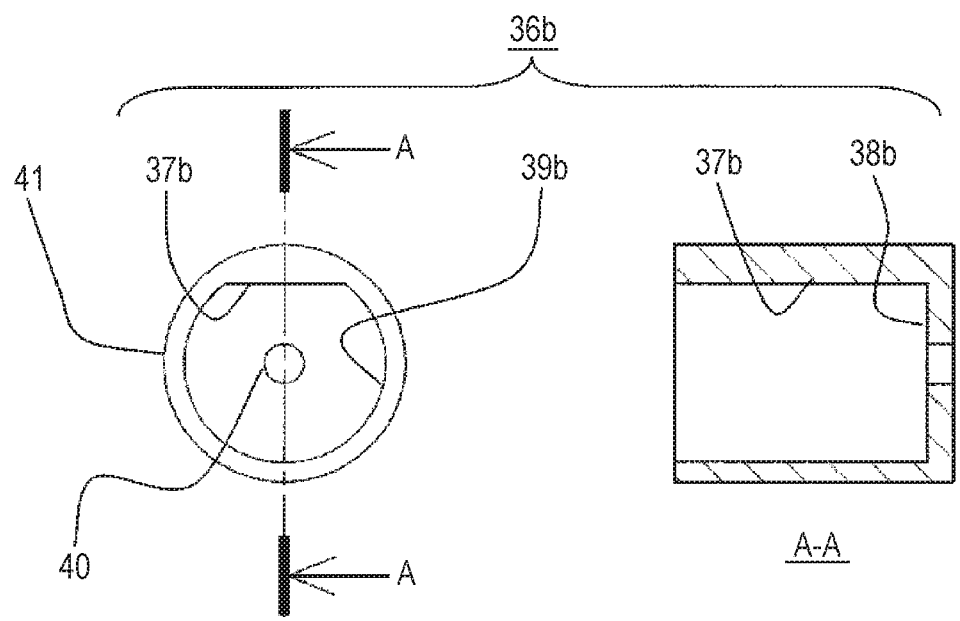
FIG. 3 is a plan view of a holder according to the first embodiment of the invention along with a sectional view taken along the line A-A.
Figure 4A:
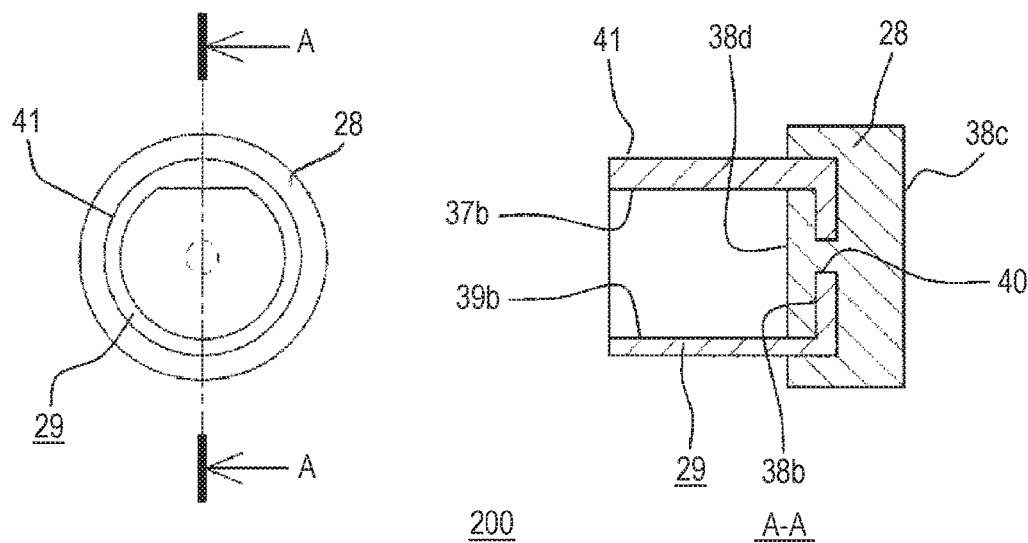
FIGS. 4A and 4B are plan views of a sensor magnet assembly according to the first embodiment of the invention each along with a sectional view taken along the line A-A.
Figure 4B:
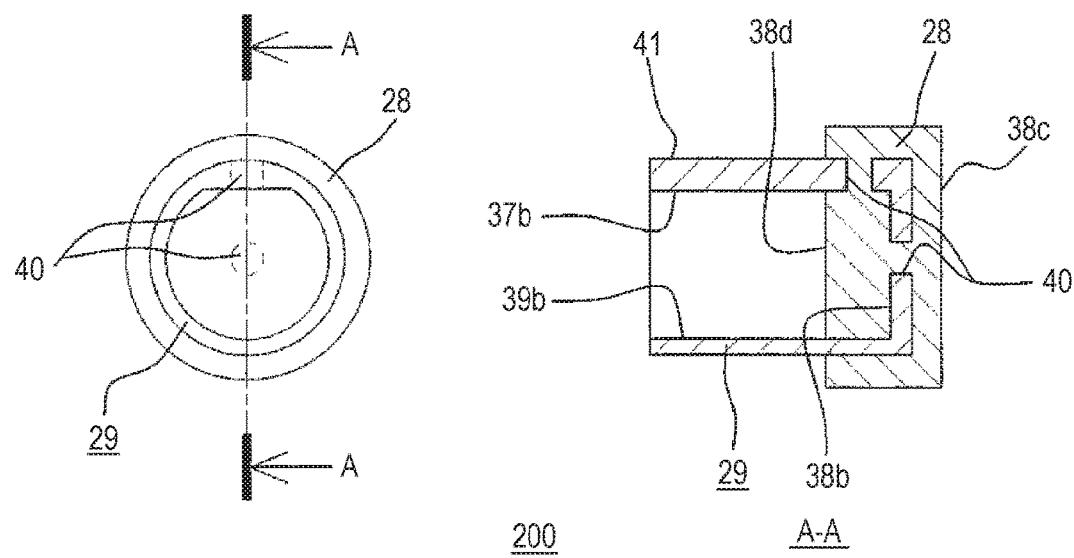

A structure of the sensor magnet assembly 200 will now be described. FIG. 3 is a plan view of the holder 29 of the first embodiment along with a sectional view taken along the line A-A. FIGS. 4A and 4B are plan views of the sensor magnet assembly 200 of the first embodiment each along with a sectional view taken along the line A-A. In the drawings, the holder 29 is made of a non-magnetic material, such as SUS and aluminum. As is shown in FIG. 3, the holder 29 includes a fit portion 36b for the rotation shaft 21 formed in the direction of the axis of rotation. The fit portion 36b has a cylinder shape with a non-circular cross section formed of at least one plane 37b parallel to the axis of rotation and a curved surface 39b connected to the plane 37b and concentric with the axis of rotation. The fit portion 36b also has an end face 38b perpendicular to the axis of rotation in an inner part of the holder 29 of a cylindrical shape. The end face 38b is provided with a hole 40 penetrating through the holder 29 from inside to outside. The hole 40 may be provided also to a surface other than the end face 38b. For example, the hole 40 penetrating through the holder 29 from inside to outside may be provided to at least one of the plane 37b and the curved surface 39b. An outer peripheral portion 41 of the holder 29 is substantially shaped like a cylindrical pillar.

As is shown in FIGS. 4A and 4B, the sensor magnet 28 is integrally molded with the holder 29 on the side of the end face 38b. The sensor magnet 28 is formed continuously from inside to outside of the holder 29 through the hole 40. Parts of the end face 38b, the plane 37b, the curved surface 39b, and the outer peripheral portion 41 of the holder 29 are inside the sensor magnet 28. FIG. 4A shows the holder 29 when the hole 40 is provided to the end face 38b and FIG. 4B shows the holder 29 provided with the holes 40 in the end face 38b and the plane 37b and the sensor magnet 28 molded integrally with the holder 29.

Regarding a shape of the sensor magnet 28, the sensor magnet 28 has an end face 38c perpendicular to the axis of rotation on a side opposing the rotation sensor and an end face 38d perpendicular to the axis of rotation on the side opposing the rotation shaft 21. A shape of the sensor magnet 28 on an inner peripheral side of the holder 29 is same as the shape of the fit poi-Lion 36b of the holder 29. A shape of the sensor magnet 28 along the outer peripheral portion 41 of the holder 29 can be a shape of a cylindrical pillar or a rectangular pillar. However, the sensor magnet 28 shaped substantially like a cylindrical pillar as shown in FIGS. 4A and 4B is preferable because homogeneity of a magnetic field can be secured.

The sensor magnet 28 is magnetized after the sensor magnet 28 is integrally molded with the holder 29. The sensor magnet 28 is positioned with respect to a magnetization yoke (not shown) using the plane 37b and the curved surface 39b of the holder 29. The sensor magnet 28 is positioned in a circumferential direction using a positioning jig (not shown) of the magnetization yoke and the plane 37b of the holder 29 and positioned in the radial direction using the curved surface 39b. The sensor magnet 28 is an isotropic magnet having a flux density of 0.4 to 0.8 [T] and a bond magnet is preferable for the reason as follows. That is, when a flux density is low, a clearance between the sensor magnet 28 and the rotation sensor has to be reduced. In such a case, processing and assembly accuracy is deteriorated and the sensor magnet 28 and the rotation sensor may interfere with each other. Conversely, when a flux density is high, a clearance has to be increased and a product size is also increased.

In view of the foregoing, it is preferable to select neither a too high nor too low flux density, that is, from 0.4 to 0.8 [T], as a flux density of the sensor magnet 28.

Figure 5:
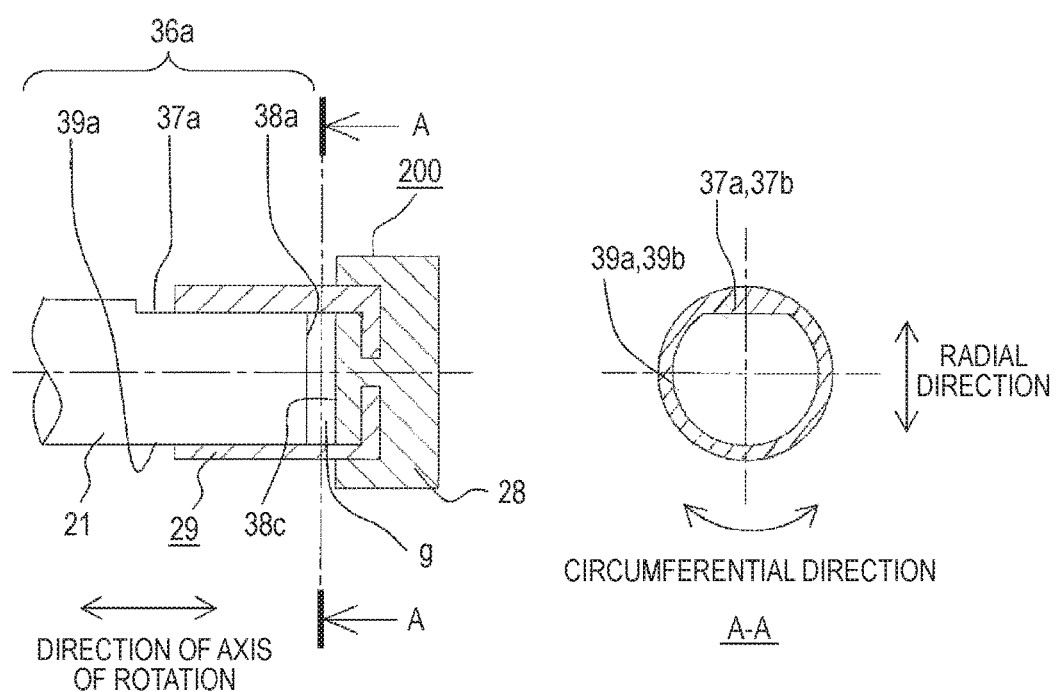
FIG. 5 is a plan view of a mount portion of the sensor magnet assembly and a rotation shaft according to the first embodiment of the invention along with a sectional view taken along the line A-A.

A positioning method of the sensor magnet assembly 200 and the rotation shaft 21 will now be described. FIG. 5 is a plan view of the sensor magnet assembly 200 and the rotation shaft 21 along with a sectional view taken along the line A-A when the rotation shaft 21 is mounted to the sensor magnet assembly 200.

As is shown in FIG. 5 and described above, the rotation shaft 21 has the fit portion 36a for the holder 29. The fit portion 36a is formed of the plane 37a parallel to the axis of rotation, the end face 38a perpendicular to the axis of rotation, and the curved surface 39a concentric with the axis of rotation.

A positional relation of the sensor magnet assembly 200 relatively with respect to rotation shaft 21 is as follows.

The sensor magnet assembly 200 and the rotation shaft 21 are positioned in the circumferential direction by mounting the rotation shaft 21 to the sensor magnet assembly 200 in such a manner that the plane 37b of the holder 29 of the sensor magnet assembly 200 and the plane 37a of the rotation shaft 21 become parallel to each other. Herein, the plane 37b of the holder 29 of the sensor magnet assembly 200 and the plane 37a of the rotation shaft 21 are either in or out of contact with each other.

Also, the sensor magnet assembly 200 and the rotation shaft. 21 are positioned in the radial direction by fitting the curved surface 39b of the holder 29 of the sensor magnet assembly 200 and the curved surface 39a of the rotation shaft 21.

Further, the sensor magnet assembly 200 and the rotation shaft 21 are positioned in an axial direction by mounting the rotation shaft 21 to the sensor magnet assembly 200 in such a manner so as to leave a slight gap g between the end face 38c of the sensor magnet 28 of the sensor magnet assembly 200 and the end face 38a of the rotation shaft 21.

Figure 6:
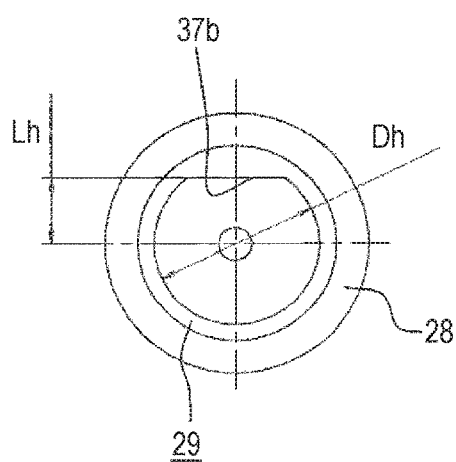
FIG. 6 is a plan view showing dimensions of the holder and the rotation shaft according to the first embodiment of the invention.
Figure 6:
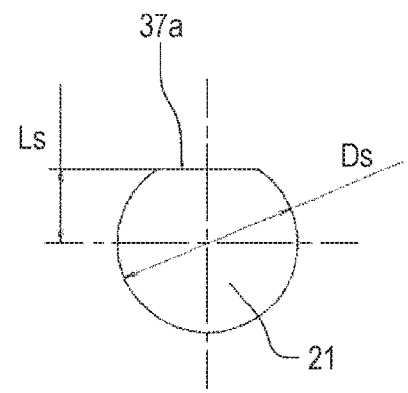
Figure 7:
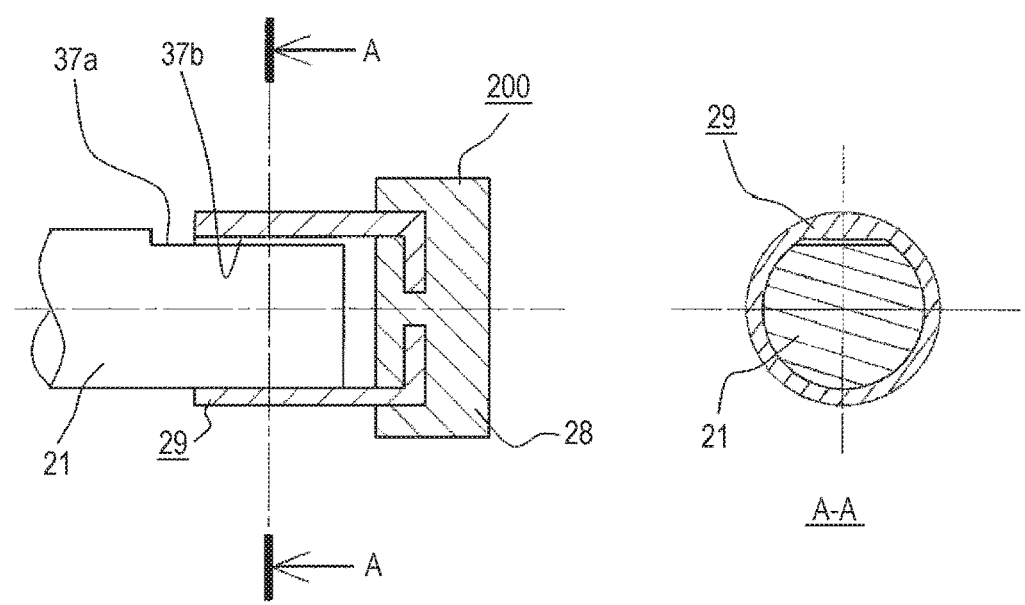
FIG. 7 is a plan view of the sensor magnet assembly and the rotation shaft according to the first embodiment of the invention along with a sectional view taken along the line A-A when the sensor magnet assembly and the rotation shaft are fixed by press-fitting.
Figure 8:
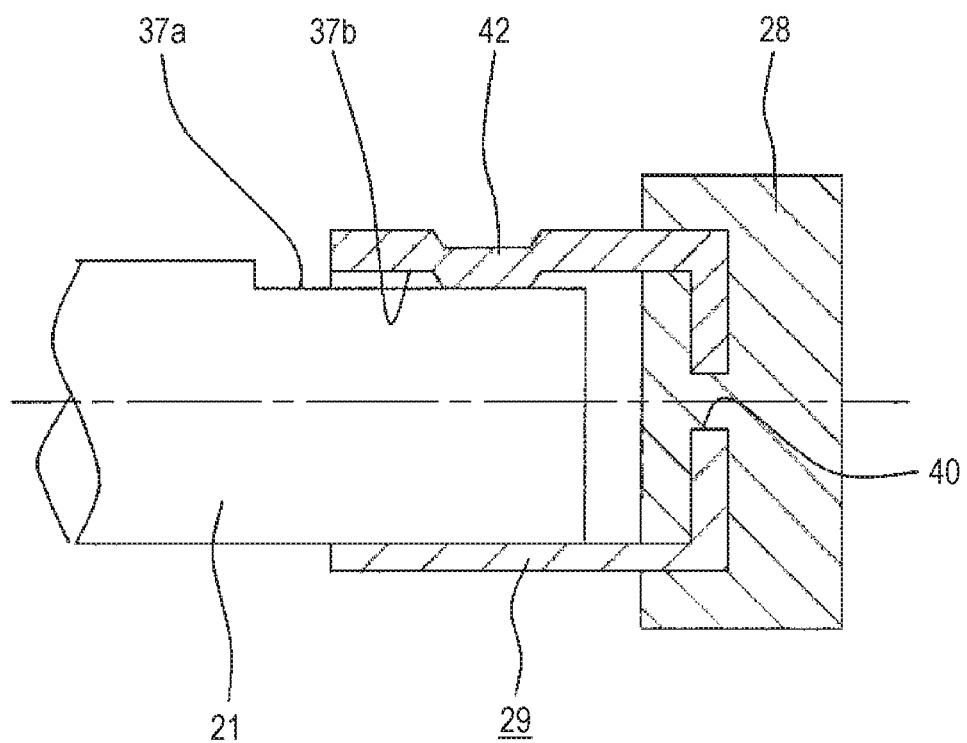
FIG. 8 is a sectional view showing the holder according to the first embodiment of the invention when a part of the holder is caulked.
Figure 9:
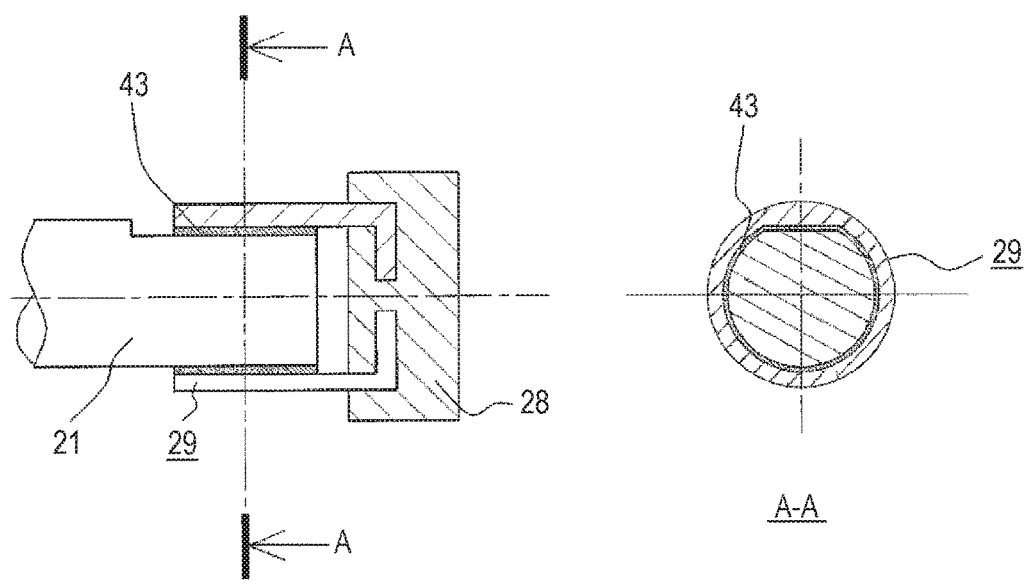
FIG. 9 is a plan view of the sensor magnet assembly and the rotation shaft according to the first embodiment of the invention along with a sectional view taken along the line A-A when the sensor magnet assembly and the rotation shaft are fixed with an adhesive.

A fixing method of the sensor magnet assembly 200 and the rotation shaft 21 will now be described FIG. 6 is a plan view showing a dimensional relation of the sensor magnet assembly 200 and the rotation shaft. 21 of this embodiment. FIG. 7 is a plan view of the sensor magnet assembly 200 and the rotation shaft 21 of this embodiment along with a sectional view taken along the line A-A when the both are press-fit together. FIG. 8 is a sectional view of the sensor magnet assembly 200 and the rotation shaft 21 of this embodiment when the both are press-fit together and fixed by caulking. FIG. 9 is a plan view of the sensor magnet assembly 200 and the rotation shaft 21 of this embodiment along with a sectional view taken along the lane A-A when the both are fixed with an adhesive.

The sensor magnet assembly 200 and the rotation shaft 21 can be fixed by press-fitting or with an adhesive.

In the case of press-fitting, the fit portion 36b of the holder 29 has to be smaller than the fit portion 36a of the rotation shaft 21. More specifically, in FIG. 6, let Dh and Ds be minor diameters of the holder 29 and the rotation shaft 21, respectively, and Lh and Ls be distances from a center of the axis of rotation to the planes 37a and 37b, respectively. Then, Dh<Ds and Lh<Ls are given to enable the press-fitting. However, due to the presence of the planes 37a and 37b, a deficiency, such as biting, is more likely to occur in comparison with a case where circular portions are press-fit together.

In such a case, by setting as: Dh<Ds and Lh>Ls, and fixing the sensor magnet assembly 200 and the rotation shaft 21 by press-fitting of the curved surfaces 39a and 39b alone, the occurrence of press-fit biting can be suppressed. In such a case, as is shown in FIG. 7, a clearance is generated between the planar portion 37b of the holder 29 and the planar portion 37a of the rotation shaft 21. When it is necessary to reduce the clearance, a caulking portion 42 is provided as is shown in FIG. 8 after the rotation shaft 21 is mounted to the sensor magnet assembly 200 by, for example, applying a pressure to the plane 37b of the holder 29 to let plane 37b undergo deformation in the radial direction and come into contact with the plane 37a of the rotation shaft 21.

In a case where the sensor magnet assembly 200 and the rotation shaft. 21 are fixed with an adhesive, by setting as Dh>Ds and Lh>Ls, an adhesive is interposed in a clearance generated between the holder 29 and the rotation shaft 21 as is shown in FIG. 9. An adhesive 43 of FIG. 9 is made extremely thick for ease of understanding.

According to this embodiment as above, positional accuracy in the circumferential direction of the sensor magnet assembly 200 and the rotation shaft 21 can be secured by using the planes 37a and 37b and positional accuracy in the radial direction can be secured by using the curved surfaces 39a and 39b. Accordingly, the rotation shaft 21 and the sensor magnet can be positioned with high accuracy. Consequently, detection accuracy of the rotation sensor can be enhanced.

The sensor magnet assembly 200 and the rotation shaft 21 are fixed by press-fitting or with an adhesive. In addition, the plane 37b of the holder 29 of the sensor magnet assembly 200 and the plane 37a of the rotation shaft. 21 engage with each other. Hence, rotations of the sensor magnet assembly 200 about the axis of rotation can be suppressed.

Further, the sensor magnet 28 is molded integrally with the holder 29 and the sensor magnet 28 is shaped so as to conform to the shape of the fit portion 36b of the holder 29. Hence, rotations of the sensor magnet 28 about the axis of rotation can be suppressed. Consequently, reliability of the product can be enhanced. Moreover, the manufacturing costs can be reduced because it is no longer necessary to use an adhesive to fix the sensor magnet 28 to the holder 29.

The sensor magnet 28 as a single member is present both in the inside and the outside of the holder 29 through the hole 40. Hence, the fixing strength of the sensor magnet 28 can be increased both in the axial direction and in the circumferential direction.

Even in a case where the planar portions of the sensor magnet 28 and the holder 29 do not engage with each other, the magnet sensor 28 can be prevented from falling off from the holder 29 and also from rotating by merely changing the position of the hole 40. By providing a gap between the sensor magnet 28 and the rotation shaft 21, an amount of the magnet used for a reduction of leaking flux can be reduced. Consequently, the manufacturing costs can be reduced. Also, by providing the gap, a variation of the clearance between the sensor magnet 28 and the rotation sensor can be reduced because a tolerance of the respective parts forming the electric motor no longer have influences on the clearance between the sensor magnet 28 and the rotation sensor.

Because the holder 29 is made of a non-magnetic material, a leaking flux during magnetization of the sensor magnet 28 after the sensor magnet 28 is molded integrally with the holder 29 can be smaller. Accordingly, the sensor magnet 28 can be magnetized fully at low ampere-turns. Hence, a temperature of the magnetization coil rises only moderately, a production time can be shorter, and the cost can be reduced. By using an isotropic magnet having a residual flux density of 0.4 to 0.8 [T] as the sensor magnet 28, a flux density at a detection position can be changed by merely changing the residual flux density without changing a shape of the sensor magnet according to a board on which multiple rotation sensors 16 each having different detection sensitivity can be mounted at different positions. In addition, because the sensor magnet 28 is shaped like a cylindrical pillar having planes at both ends, homogeneity of a magnetic field can be secured.

By installing the electric motor with high detection accuracy of a rotation angle as formed in this embodiment, the electric power steering device 100 generating an adequate assist torque can be obtained. Because the sensor magnet assembly 200 is formed of only two parts, that is, the holder 28 and the sensor magnet, a lightweight electric power steering device of a simple structure capable of preventing a fall-off and rotations of the sensor magnet without using an adhesive can be obtained. Moreover, because an integrally-molded magnet is used, the electric power steering device can be inexpensive, more fuel-efficient, and safe-oriented.

Second Embodiment

A configuration and a structure of an electric motor and an electric power steering device are same as those of the counterparts of the first embedment above except for a sensor magnet assembly 200.

Figure 10:
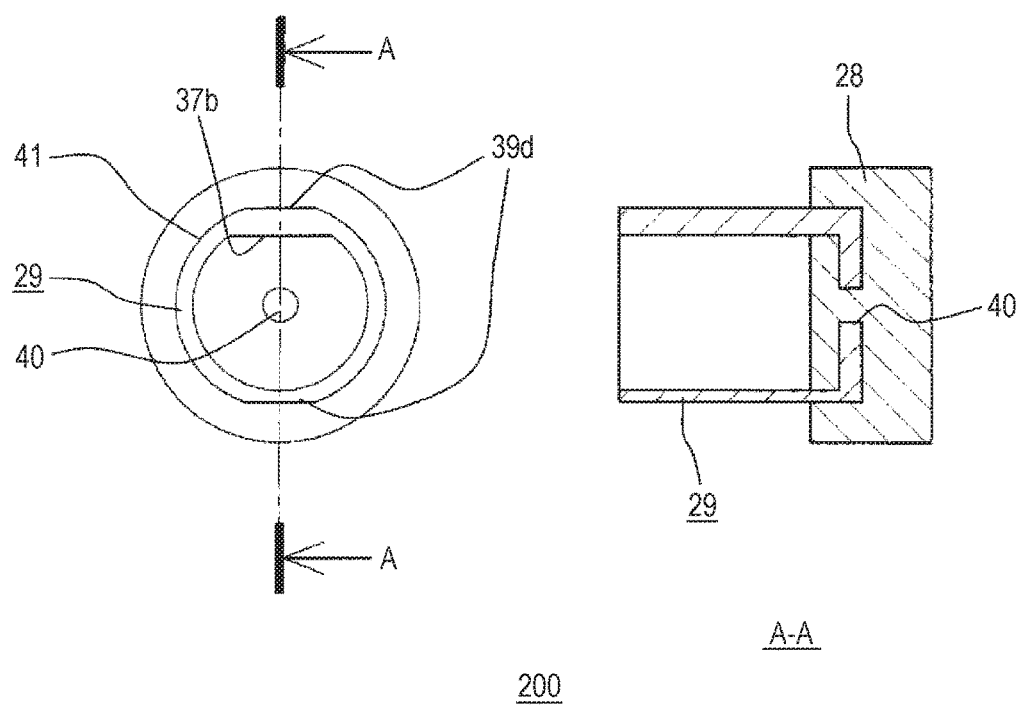
FIG. 10 is a plan view of a sensor magnet assembly according to a second embodiment of the invention along with a sectional view taken along the line A-A.
Figure 11:
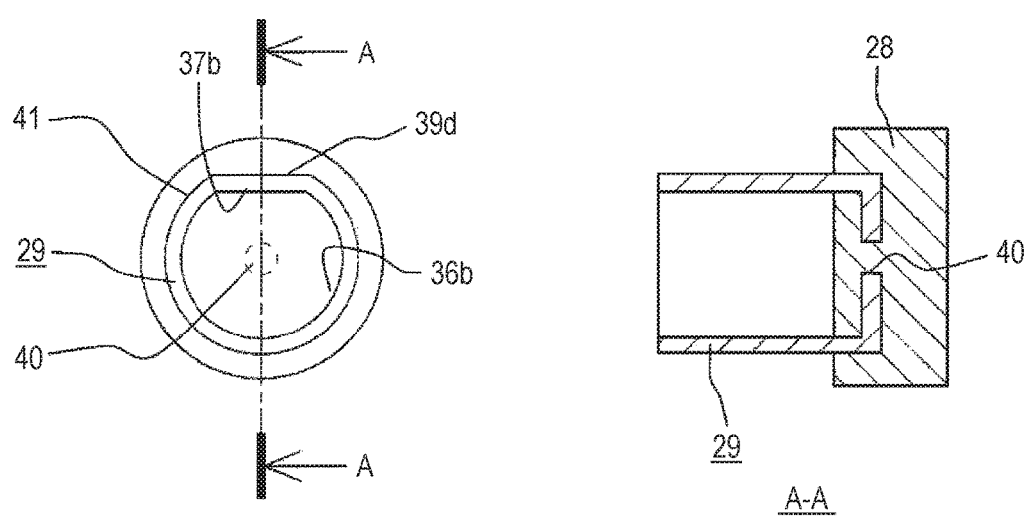
FIG. 11 is a plan view of another sensor magnet assembly according to the second embodiment of the invention along with a sectional view taken along the lane A-A.

The sensor magnet assembly 200 of this embodiment will be described. FIG. 10 and FIG. 11 are plan views of the sensor magnet assembly 200 of the second embodiment each along with a sectional view taken along the line A-A.

In this embodiment, at least one plane 39d parallel to an axis of rotation is provided to an outer peripheral portion 41 of a holder 29. The rest is same as the counterparts of the first embodiment above.

According to this embodiment as described above, the planar portion 39d is provided to the outer peripheral portion 41 of the holder 29. Hence, rotations of a sensor magnet 28 about the axis of rotation can be suppressed more steadily. By providing two planes as shown in FIG. 10, the product becomes easy to hold and hence ease of transportation can be enhanced.

In a case as shown in FIG. 11 where the plane 39d of the outer peripheral portion 41 and a plane 37b of a fit portion 36h for a rotation shaft 21 are parallel, that is, when the outer peripheral portion 41 and the fit portion 36b are formed in a same shape, the outer peripheral portion 41 and the fit portion 36b can be formed, for example, by subjecting a thin plate to drawing using a pressing machine. Consequently, the cost can be reduced in comparison with cut processing.

Third Embodiment

Figure 12:
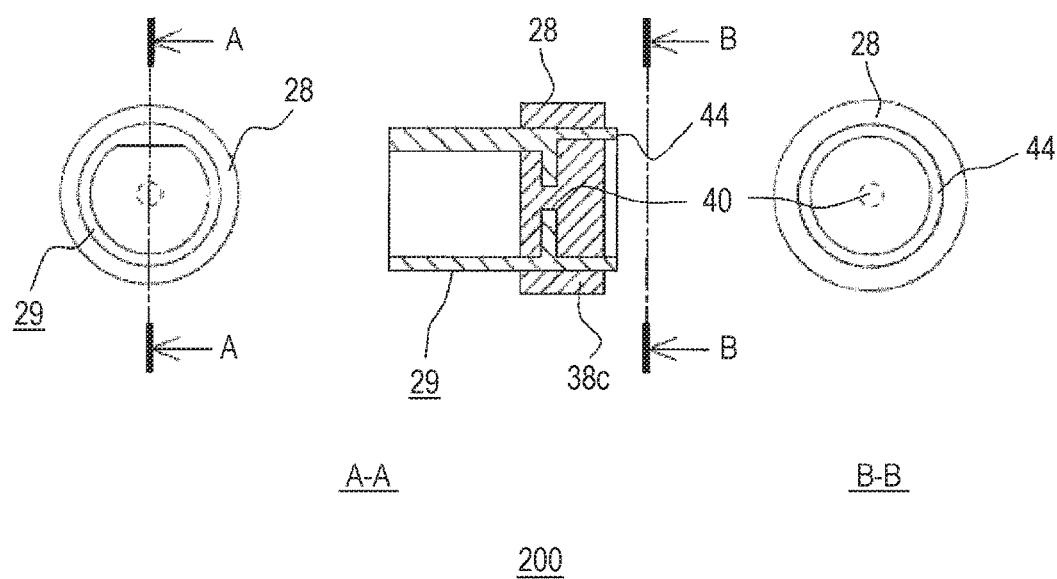
FIG. 12 is a plan view of a sensor magnet assembly according to a third embodiment of the invention along with a sectional view taken along the line A-A.

A configuration and a structure of an electric motor and an electric power steering device are same as those of the counterparts of the first embedment above except for a sensor The sensor magnet assembly 200 of this embodiment will be described. FIG. 12 is a plan view of the sensor magnet assembly 200 of the third embodiment along with a sectional view taken along the line A-A.

The sensor magnet assembly 200 is same as the counterpart in the first embodiment above except for a protrusion 44 which is a part of a holder 29 protruding in a direction of an axis of rotation from an end face 38c of a sensor magnet 28.

According to this embodiment as above, the sensor magnet assembly 200 has the protrusion 44, which is a part of the holder 29 protruding in the direction of the axis of rotation from the end face 38c of the sensor magnet 28. Hence, when the sensor magnet assembly 200 is mounted to a rotation shaft 21 by, for example, press-fitting, a direct application of a pressure to the sensor magnet 28 can be avoided by pressing the protruding holder 29. Accordingly, there can be achieved an effect that breaking and chipping of the magnet can be suppressed.

DESCRIPTION OF REFERENCE NUMERALS AND SIGNS

1: steering wheel, 2: electric motor, 3: reduction device, 4: control device, 5: battery, 6: torque sensor, 7: power connector, 8: vehicle-side signal connector, 9: torque sensor connector, 10: armature winding, 11: stator, 12, 12a, and 12b: semiconductor switching element, 13: shunt resistor, 14: smoothing capacitor, 15: coil, 16: rotation sensor, 17: sensor board, 18: microcomputer, 19: drive circuit, 20: control board, 21: rotation shaft, 22a and 22b: bearing, 23: rotor magnet, 24: rotor, 25: frame, 26: housing, 27: coupling, 28: sensor magnet, 29: holder, 30: insulator, 31: screw, 32: heat sink, 33: power circuit, 34: circuit case, 35: bus bar, 36a: fit portion of rotation shaft, 36b: fit portion of holder, 37a and 37b: plane, 38a, 38b, 38c, and 38d: end face, 39a and 39b: curved surface, 39d: plane, 40: hole, 41: outer peripheral portion, 42: caulking portion, 43: adhesive, 44: protrusion, 100: electric power steering device, 200: sensor magnet assembly

The invention claimed is:

1. An electric motor comprising;
a rotation shaft;
a rotor mounted to the rotation shaft;
a stator mounted so as to oppose an outer peripheral surface of the rotor;
a cylindrical holder mounted to an end of the rotation shaft;
a sensor magnet mounted to the holder; and
a rotation sensor mounted at a position at which the rotation sensor opposes the sensor magnet in a direction of an axis of rotation and detecting a rotating field of the sensor magnet; wherein
the end of the rotation shaft where the holder is mounted has a cylindrical shape with a non-circular cross section formed of at least one plane and a curved surface in an outer peripheral portion;
at least one of an inner peripheral portion and an outer peripheral portion of the holder forms a non-circular cross section formed of a plane parallel to the axis of rotation and a curved surface connected to the plane;
the plane of the rotation shaft and the plane of the holder are parallel to each other and the curved surface of the rotation shaft and the curved surface of the holder are in contact with each other; and
the sensor magnet is integrally molded with the holder continuously from an inside of the holder to an outside of the holder through a hole provided on an end face of the holder.

2. The electric motor according to claim 1, wherein the sensor magnet is integrally molded with the holder at one end and fixedly supported at the one end.

3. The electric motor according to claim 2, wherein the holder is provided with at least one hole in a portion where the sensor magnet is integrally molded.

4. An electric power steering device, comprising the electric motor set forth in claim 3.

5. An electric power steering device, comprising the electric motor set forth in claim 2.

6. The electric motor according to claim 1, wherein the sensor magnet and the rotation shaft have a gap in a direction of the axis of rotation via the holder.

7. An electric power steering device, comprising the electric motor set forth in claim 6.

8. The electric motor according to claim 1, wherein the holder is made of a non-magnetic material.

9. An electric power steering device, comprising the electric motor set forth in claim 8.

10. The electric motor according to claim 1, wherein the sensor magnet is shaped substantially like a cylindrical pillar with planes at both ends.

11. An electric power steering device, comprising the electric motor set forth in claim 10.

12. The electric motor according to claim 1, wherein the sensor magnet is an isotropic magnet having a residual flux density of 0.4 to 0.8 [T].

13. An electric power steering device, comprising the electric motor set forth in claim 12.

14. The electric motor according to claim 1, wherein the planar portion provided to the outer peripheral portion of the holder and a plane of a fit portion for the rotation shaft are parallel each other.

15. An electric power steering device, comprising the electric motor set forth in claim 14.

16. The electric motor according to claim 1, wherein the holder has a protrusion, which is a part of the holder protruding in the direction of the axis of rotation from an end face of the sensor magnet on a side opposing the rotation sensor.

17. An electric power steering device, comprising the electric motor set forth in claim 1.

* * * * *